INVENTORS
WALTON GRAHAM
MICHAEL J. DI TORO
BY
Louis B. Appleba
ATTORNEY

3,021,479
METHOD AND MEANS FOR SPECTRUM ANALYSIS OF RADIO SIGNALS

Michael J. Di Toro, Massapequa, and Walton Graham, East Meadow, N.Y., assignors, by mesne assignments, to the United States of America as represented by the Secretary of the Navy
Filed Feb. 26, 1959, Ser. No. 795,877
18 Claims. (Cl. 324—77)

This invention relates to the spectrum analysis of signals and especially to a method and means for continuous narrow-band spectrum analysis of radio signals.

The usefulness of spectrum analyzers is evidenced by the large number which are commercially available. Some of the presently available instruments which work at sonic frequencies are the May Electric Sonolator and Sona-graph, the Panoramic Sonic Analyzer, the Western Electric 4–A Analyzer, the Hewlett-Packard Wave Analyzer and the General Radio Wave Analyzer. An important application of spectrum analyzers at the present time lies in the field of submarine and torpedo detection.

Radio spectrum analyzers may be divided into two categories: those which use a single filter to scan the spectrum; and those which use a number of filters simultaneously. The frequency resolution of either type is ultimately limited by the duration of the signal, but in practice the signal filter type is often limited by the time required to scan the spectrum and the multiple filter type is limited by the cost and complexity of increasing numbers of filters and means for scanning their outputs. The usefulness of the single filter type suffers from the possibility of missing a transient signal by being tuned to another frequency during the occurrence of the signal. This type also gives erroneous indications on impulsive noise which plots as a tone at the frequency at which the filter happens to be tuned.

The present invention is distinguished by monitoring a complete band of frequencies all of the time with only a single filter and yet with greater frequency resolution than is practicable with the multiple filter type of analyzer because of cost and maintenance (tuning) problems.

The objects and advantages of the present invention are accomplished by increasing, in effect, the apparent playback speed of a recorded signal (the signal to be analyzed) relative to the recording speed, although the actual recording and playback speeds may be identical. The apparent increase in playback speed is accomplished by the manner in which the signal is recorded.

In a typical embodiment of the invention, the signal to be analyzed is broken into a number of pulses sufficient to define the signal. These sampling pulses are recorded on a rotating recording drum in such a way that, although each succeeding pulse is recorded next to the one immediately preceding it, the recording is done only after the drum has rotated substantially one or more complete revolutions (if only one recording and playback head is used). Since the drum rotates at the same constant speed for both recording and playback functions, the series of recorded pulses appear to be played back at a greater speed than that at which they were recorded. This follows from the fact that the time of playback may be the time required for one revolution of the drum or less, while the time required for recording is that required for a great number of revolutions of the drum.

An object of this invention is to analyze the spectrum of signals.

Another object is to analyze the spectrum of signals by means of only a single filter.

A further object is to scan a complete band of frequencies with a single-filter analyzer without missing transient signals at frequencies different than that being scanned by the analyzer at the time of occurrence of the transient signals.

Yet another object is to continuously monitor a complete band of frequencies with only a single filter and yet with a frequency resolution comparable to that provided by multiple-filter analyzers.

Other objects and many of the attendant advantages of this invention will be readily appreciated as the same becomes better understood by reference to the following detailed description when considered in connection with the accompanying drawings wherein—

The theoretical considerations which underline this invention will be considered before the detailed structure of the invention is described.

Given a signal of bandwidth W and duration T, it has been established that 2TW numbers suffice to define the signal. One mode of arriving at this conclusion is based on a Fourier series expansion. If only the power spectrum of the signal is desired, only TW numbers are required. These numbers designate bands of power $$\frac{1}{T}$$

cycles per second (c.p.s.) wide over the bandwidth W, giving $$W\bigg/\frac{1}{T}=TW \text{ numbers}$$

Take as an example a signal of 1200 c.p.s. bandwidth (W) and 0.2 second duration (T); then $$\frac{1}{T}=5 \text{ cps}$$

and TW=0.2×1200=240. The number of filters required to analyze this signal by the multiple-filter technique would be two hundred and forty 5 c.p.s. filters. A single scaning filter, if the signal is recorded and played back repetitively would analyze the signal in 240×0.2, or 48, seconds (that is, it would require 0.2 second to build up in each of the 240 bands).

In the proposed method, the signal is effectively played back at 240 times the recording speed. The spectrum now extends over 1200×240 c.p.s., or 288 kc. The duration of the signal is now $$\frac{0.2}{240}$$

or 1/1200 second. The new analyzer bandwidth is 5×240, or 1200 c.p.s. for the equivalent 5 c.p.s. frequency resolution and the 1200 c.p.s. scanning filter requires 1/1200 second to build up at any frequency. If the recorded signal is played back 240 times faster than it was recorded, the entire spectrum may be analyzed in only 0.2 second with the single 1200 c.p.s. filter.

For the general case, the minimum amount of frequency multiplication required for the analysis to keep up with the flow of information may be derived as follows:

$W$ = bandwidth of signal to be analyzed
$T$ = duration of signal
$b$ = frequency resolution possible = $\dfrac{1}{T}$ $t$ = time to scan the spectrum with a single filter
$N$ = factor of frequency multiplication Without frequency multiplication:

$$t = \frac{W}{b^2}$$

With frequency multiplication, the bandwidth W increases to NW, and b increases to Nb, so that:

$$t = \frac{NW}{(Nb)^2} = \frac{W}{Nb^2}$$

For the analysis to keep pace with the signal it is necessary that $t \leq T$. For $t = T$, N is a minimum and:

$$\frac{W}{Nb^2} = t = T = \frac{1}{b}$$

so that:

$$N = \frac{W}{b} = Wt$$

In other words, the multiplication required equals TW numbers, the frequency information in the signal exclusive of phase. Also, the analyzer bandwidth after multipication, $b'$, equals the bandwidth of the original spectrum since:

$$b' = Nb = \frac{N}{T} = \frac{WT}{T} = W$$

Figure 1:
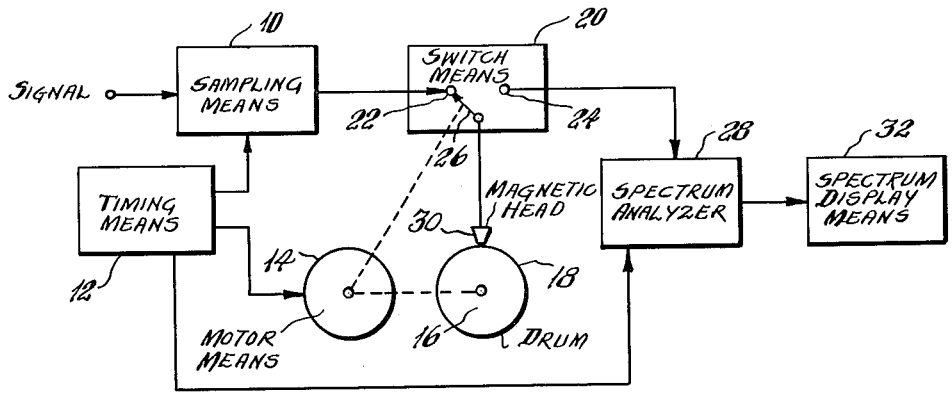
FIG. 1 is a block diagram of an embodiment of the invention.

Coming now to a specific embodiment of the invention, FIG. 1 shows the invention in block form. The signal to be analzed is sampled by a series of pulses produced in the sampling means 10. The repetition rate of the sampling pulses is determined by the repetition rate of timing pulses supplied by the timing means 12.

The timing means 12 is also employed to supply timing pulses to motor means 14 which rotates a drum 16 at a rate determined by the repetition rate of the timing pulses. The drum 16 carries a magnetic recording medium 18, such as magnetic tape, upon its circumference.

Since the number of sampling pulses employed to sample the signal are sufficient to define the signal (TW pulses in the case of analysis of the power spectrum of the signal), the output of the sampling means 10 may be designated the defining signal, or defining pulses. The defining pulses are applied to one contact 22 of switch means 20, which may be a rotary switch, the other contact 24 being connected to a spectrum analyzer 28, such as the Sonic Analyzer manufactured by the Panoramic Radio Products Company. The contact arm 26 of the switch means 20 is connected to a magnetic recording-and-pickup head 30 which is physically located in close proximity to the recording medium 18 on the drum 16.

The movement of the contact arm 26 of the switch means 20 is controlled mechanically by the motor means 14 so that, after the defining pulses have been recorded, the contact arm 26 switches from the "record" position 22 of the switch means 20 to the "pickup" position 24, and after the entire recorded signal has been derived from the recording medium 18 and analyzed and displayed by the spectrum display means 32, the contact arm 26 is moved back to the recording position.

The timing means 12 determines the repetition rate of the sampling pulses and the rate of rotation of the drum 16, the relation being such that the drum 16 makes at least one complete revolution (or multiples of a complete revolution, if desired) before each succeeding pulse is recorded in a physical location which is directly behind the preceding pulse. Thus, even though the time between each of the sampling and defining pulses amounted to the time required for a complete revolution of the drum plus a small interval $(x)$, the time on playback between each of the recorded or derived pulses is only the small interval $(x)$. Thus, compression of the time interval, or time spacing, between pulses is accomplished without varying the speed of rotation of the drum 16 during recording or playback.

The spectrum display means 32 may be a cathode ray oscillograph which may either be part of, or separate from, the analyzer, or it may comprise any other spectrum display means such as means for recording the spectrum on a roll of graph paper.

As an example of physical dimensions which may be typically employed with an embodiment such as that of FIG. 1, assume that a signal of 0.2 second duration and having a 1200 c.p.s. banwidth (W) is to be analyzed by multiplying by a factor (N) of 240. The highest playback frequency is then 288 kc. The pulse rate recorded on the drum must be at least twice the highest frequency, or 576 kc., in order for the signal to be defined. If a spacing of 0.01 inch between the centers of the pulses on the magnetic surface of the drum is accepted, the peripheral velocity of the drum will be $0.01 \times 576{,}000 = 5{,}760$ inches per second. Using a 400 r.p.s. motor, a drum having a circumference of $5760/400 = 14.4$ inches is required. This corresponds to a diameter of about 4.84 inches. To sample the original 1200 c.p.s. signal, a pulse sampling rate of at least 2400 c.p.s. is required. In $\frac{1}{2400}$ second the drum revolves only $\frac{1}{6}$ of a revolution. Therefore, six magnetic heads spaced equidistantly around the periphery of the drum must be used if successive defining pulses are to be recorded very close to each other. The duration of the signal on playback equals $0.2\frac{2}{240}$ or $\frac{1}{1200}$, second. Since the drum revolves once in $\frac{1}{400}$ second, the signal must appear three times per revolution of the drum. These requirements are met by feeding alternate sampling pulses to alternate sets of three recording heads.

Figure 2:
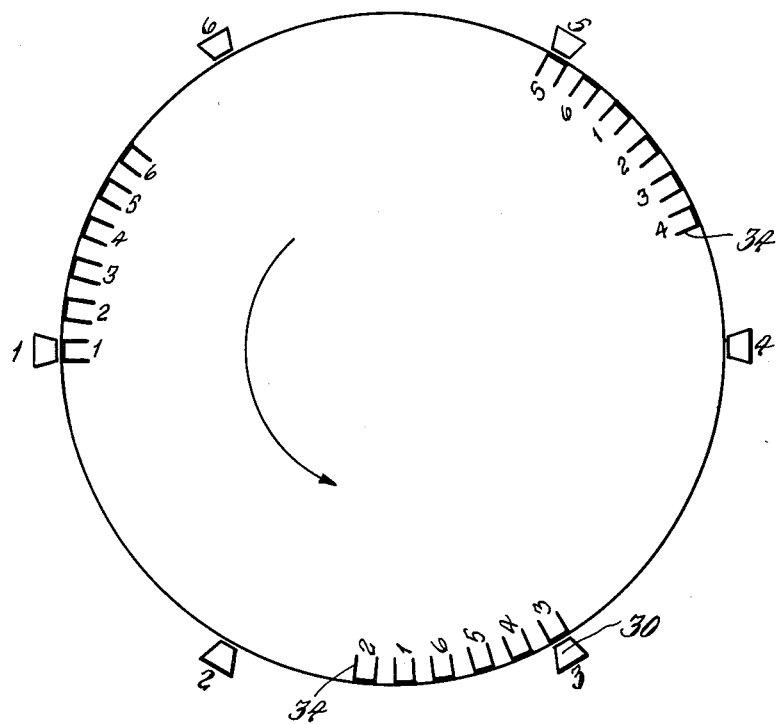
FIG. 2 is a diagrammatic representation of the arrangement of recording heads and recorded pulses around the periphery of the recording drum.

FIG. 2 is a diagrammatic representation of a drum and two sets of three recording heads, the first set being numbered 1, 3 and 5 and the second set being numbered 2, 4 and 6. Each recording head in a set is spaced 120 degrees from the others and 60 degrees from adjacent heads of the alternate set. The first defining pulse is recorded by heads 1, 3 and 5 simultaneously. The next pulse is recorded 0.01 inch behind the first pulse after the drum has rotated $\frac{1}{6}$ of a revolution plus 0.01 inch. The recorded pulses 34 are shown in six sets numbered in accordance with the number of the magnetic head which recorded it. The direction of rotation of the drum is indicated by the arrow.

The time between pulses is the time required for the periphery of the drum to travel $\frac{1}{6}$ of a revolution minus 0.01 inch or $\frac{1}{6} \times \frac{1}{400} - 0.01/5760 = 0.00041493$ second, which is equivalent to a pulse repetition rate of 2410 c.p.s. Pulses are then recorded every $\frac{1}{2410}$ second for 0.2 second, or 80 revolutions of the drum. This recorded signal is then read off on playback for 80 more revolutions during which time the output is analyzed by a scanning 1200 c.p.s. filter. The recorded signal is derived by one of the recording heads or, alternatively, by an independent pickup head.

While the recorded signal is being analyzed, the incoming signal may be recorded in the same way on another track on the same drum, recording and analysis proceeding alternately between the two tracks.

Figure 3:
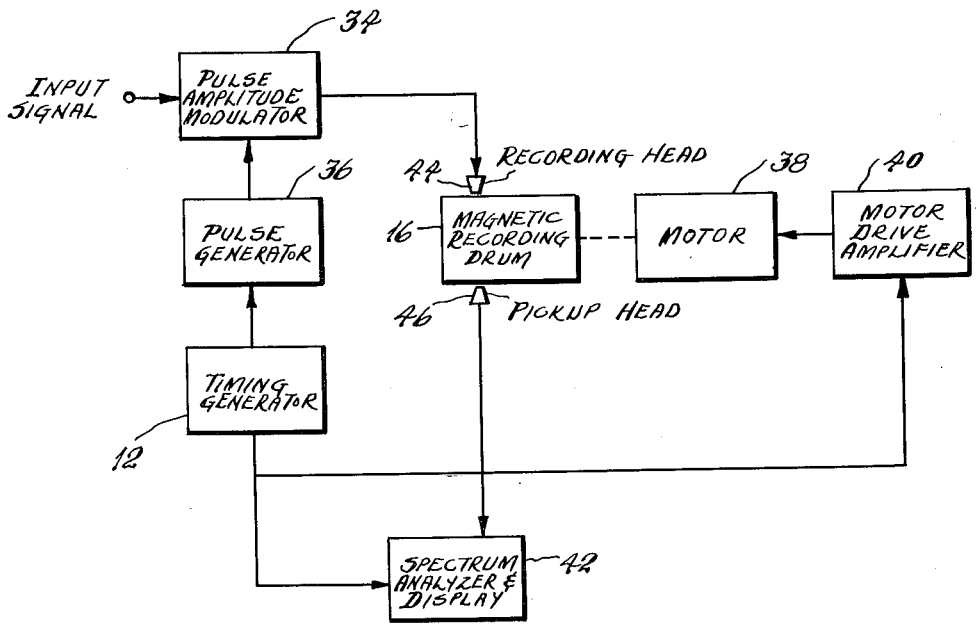
FIG. 3 is a block diagram of another embodiment of the invention.

FIG. 3 illustrates a second embodiment of the invention which obvitaes the need for switch means 20 by employing independent recording and pickup heads, 44 and 46 respectively. More than one of each type of head may be employed, as in the embodiment of FIG. 1

The sampling means 10 of FIG. 1 is shown broken down into two components, a pulse generator 36 and a pulse amplitude modulator 34. The pulse generator may, for example, be a single-shot multivibrator as illustrated on page 167 of vol.19 (Waveforms) of the M.I.T. Radiation Lab. Series (McGraw-Hall) and the pulse amplitude modulator may, for example, be that shown in U.S. Patent 2,262,838, Deloraine and Reeves.

Timing circuits which will generate basic timing signals for sampling pulses and a timing signal for driving the synchronous motor 38 are shown on pages 804 and 795, respectively, of "Electronic Circuits and "Tubes" by the Cruft Electronics Staff (McGraw-Hill 1947 edition).

A motor drive amplifier 40 which may be employed to drive a synchronous motor is shown on pages 395–397 of "Electronic Circuits and Tubes."

A magnetic recording drum 16 which is usable with this invention is described in an article entitled "The Reproduction of Magnetically Recorded Signals" by Wallace in the Bell System Technical Journal, Vol. XXX, page 1145.

Means other than those previously mentioned may be employed in different embodiments of the invention. For example, various types of pulse generators may be employed instead of a rotary switch; a storage tube and suitable circuitry may be used in place of the present recording and pickup head, medium and drum; etc.

Obviously may modifications and variations of the present invention are possible in the light of the above teachings. It is therefore to be understood that within the scope of the appended claims the invention may be practiced otherwise than as specifically described.

We claim:

1. In combination with a spectrum analyzer, connections for a signal of which a spectrum analysis is to be made, means for sampling said signal with a plurality of pulses, the number of sampling pulses being the quantity required to define said signal, a recording medium, and means for recording the sampling pulses upon said recording medium and for thereafter deriving the recorded signal therefrom, a constant rate of relative movement being maintained between said recording medium and said pulse recording-and-deriving means, the recording being accomplished in such a manner that the repetition rate of the derived pulses is faster than the repetition rate of the pulses in the sample to be recorded.

2. In combination with a spectrum analyzer, connections for a signal of which a spectrum analysis is to be made, means for sampling said signal with a plurality of pulses, the number of sampling pulses being the quantity required to define said signal, and pulse recording-and-deriving means comprising a recording medium, means for recording the sample on said recording medium, means for deriving the recorded signal from said recording medium, and means for effecting relative movement at a constant speed between said recording medium and said recording-and-deriving means, the time spacing between sampling pulses being compressed in recording by physically disposing the sampling pulses on the recording medium in such manner that despite the constant speed of the recording medium, the pulses in the derived signal have a greater repetition rate than the pulses in the original sample.

3. In combination with a spectrum analyzer, connections for a signal of which a spectrum analysis is to be made, means for sampling said signal with a plurality of pulses, the number of sampling pulses being the quantity required to define said signal, and pulse recording-and-deriving means comprising a recording medium, means for recording the sample on said recording medium, means for deriving the recorded signal from said recording medium, and means for effecting relative movement at a constant speed between said recording medium and said recording and deriving means, said recording means effecting a time displacement between pulses of the sample and the recorded pulses by physically disposing the recorded pulses in such manner that, despite the constant speed of the recording medium, the pulses in the derived signal have a greater repetition rate than the pulses in the original sample.

4. In combination with a spectrum analyzer, connections for a signal of which a spectrum analysis is to be made, means for sampling said signal with a plurality of pulses, the number of sampling pulses being the quantity required to define said signal, pulse recording-and-deriving means comprising a recording medium, means for recording the sample on said recording medium, means for deriving the recorded signal from said recording medium, and means for effecting relative movement at a constant speed between said recording medium and said recording-and-deriving means, said recording means effecting a time displacement between pulses of the sample and the recorded pulses by physically disposing the recorded pulses in such manner that, despite the constant speed of the recording medium, the pulses in the derived signal have a greater repetition rate than the pulses in the original sample, and timing means for synchronizing the operation of said sampling means and said pulse recording-and-deriving means.

5. Apparatus as set forth in claim 4, wherein said means for sampling said signal comprises a pulse generator and a modulator connected thereto, said recording-and-deriving means comprise at least one magnetic recording and pickup head, said means for effecting relative movement comprises a cylindrical magnetic recording drum, a motor and motor drive means, and said recording medium comprises a magnetizable agency carried by said drum.

6. In combination with a spectrum analyzer, connections for a signal of which a spectrum analysis is to be made, means for sampling said signal with a plurality of pulses, the number of sampling pulses being sufficient to define said signal, a recording medium, a rotatable drum carrying said recording medium, magnetic recording and pickup means for selectively recording the defining pulses upon said recording medium and deriving the recorded pulses therefrom, each consecutive defining pulse being physically recorded directly behind its preceding pulse after at least one complete rotation of said drum has occurred, the effect of such method of recording being to compress the time interval between the recorded pulses with reference to the time interval between the defining pulses, means for selectively connecting said recording and pickup means to said sampling means and to said spectrum analyzer, motor means for rotating said drum and actuating said selective connection means, timing means connected to said sampling means and said motor means for synchronizing the rate of rotation of said drum with the pulse repetition rate of the sampling pulses so that each consecutive pulse will occur and be recorded directly behind its preceding pulse, as mentioned heretofore, and for effecting the actuation of said selective connection means so as to switch the connections of said recording and pickup means at the correct instants of time after all of the defining pulses have been recorded and after all the recorded pulses have been derived from the recording medium.

7. Apparatus as set forth in claim 6, wherein said recording and pickup means comprises a plurality of recording and pickup heads spaced equidistantly around said drum, whereby the speed of rotation of said drum may be reduced and the diameter of said drum increased in proportion to the number of such heads, the other characteristics of the system being maintained unchanged.

8. A method for accomplishing a continuous spectrum analysis of a signal by means of a single-filter spectrum analyzer comprising the steps of: sampling the signal with a plurality of pulses sufficient to define the signal, the sampling pulses being separated from each other by a definite time spacing; recording the defining pulses upon a recording medium which moves cyclically relative to the recording means; during said step of recording, compressing the time spacing between the defining pulses by suitable physical disposition of the pulses on the recording medium; deriving the recorded pulses from the recording medium with a pickup device having the same rate of cyclical movement relative to said medium as said recording means, the derived pulses having a greater repetition rate than the defining pulses because of the compression of the time spacing between pulses during the step of recording; and applying the derived pulses to a single-filter spectrum analyzer for a spectrum analysis of said signal.

9. A method for accomplishing a continuous spectrum analysis of a signal by means of a single-filter spectrum analyzer comprising the steps of: sampling the signal with a plurality of pulses sufficient to define the signal, the sampling pulses being separated from each other by a definite time spacing; recording the defining pulses upon a recording medium which moves at a constant cyclical rate relative to the recording means; during said step of recording, compressing the time spacing between the defining pulses by suitable physical disposition of the pulses on the recording medium; deriving the recorded pulses from the recording medium with a pickup device having the same rate of cyclical movement relative to said medium as said recording means, the derived pulses having a greater repetition rate than the defining pulses because of the compression of the time spacing between pulses during the step of recording; and applying the derived pulses to a single-filter spectrum analyzer for a spectrum analysis of said signal.

10. A method for increasing the playback speed relative to the recording speed in signal-recording apparatus comprising the steps of: sampling the signal which is to be recorded with a plurality of pulses sufficient to define the signal, the sampling pulses being separated from each other by a definite time spacing; recording the defining pulses upon a recording medium which moves cyclically relative to the recording means; compressing the time spacing between the defining pulses during said step of recording by suitable physical disposition of the pulses on the recording medium; and deriving the recorded pulses from the recording medium with a pickup device having the same rate of cyclical movement relative to said medium as said recording means, the derived pulses having a greater repetition rate than the defining pulses because of the compression of the time spacing between defining pulses effected during the step of recording.

11. A method for increasing the playback speed relative to the recording speed in signal-recording apparatus comprising the steps of: sampling the signal which is to be recorded with a plurality of pulses sufficient to define the signal, the sampling pulses being separated from each other by a definite time spacing; recording the defining pulses upon a recording medium which moves at a constant cyclical rate relative to the recording means; compressing the time spacing between the defining pulses during said step of recording by suitable physical disposition of the pulses on the recording medium; and deriving the recorded pulses from the recording medium with a pickup device having the same rate of cyclical movement relative to said medium as said recording means, the derived pulses having a greater repetition rate than the defining pulses because of the compression of the time spacing between defining pulses effected during the step of recording.

12. A method for increasing the playback speed relative to the recording speed in signal-recording apparatus comprising the steps of: sampling the signal which is to be recorded with a plurality of pulses sufficient to define the signal, the sampling pulses being separated from each other by a definite time spacing; recording the defining pulses upon a recording medium which moves at a constant cyclical rate relative to the recording means; compressing the time spacing between the defining pulses during said step of recording by recording each successive sampling pulse behind the preceding one in close physical proximity thereto but only after a time interval corresponding to the time required for at least one multiple of a cycle of relative movement divided by the number of recording elements plus the time equivalent of the physical distance between each recorded pulse; and deriving the recorded pulses from the recording medium with a pickup device having the same rate of cyclical movement relative to said medium as said recording means, the derived pulses having a greater repetition rate than the defining pulses because of the compression of the time spacing between defining pulses effected during the step of recording.

13. A device for increasing playback speed relative to recording speed in signal-recording apparatus comprising, in combination: means for sampling the signal to be recorded, the number of sampling pulses being the quantity required to define said signal; a recording medium; and means for recording the sampling pulses upon said recording medium and for thereafter deriving the recorded signal therefrom, a constant rate of relative movement being maintained between said recording medium and said pulse-recording-and-deriving means, the recording being accomplished in such a manner that the repetition rate of the derived pulses is faster than the repetition rate of the pulses in the sample to be recorded.

14. A device for increasing playback speed relative to recording speed in signal-recording apparatus comprising, in combination: means for sampling the signal to be recorded, the number of sampling pulses being the quantity required to define said signal; and pulse recording-and-deriving means comprising a recording medium, means for recording the sample on said recording medium, means for deriving the recorded signal from said recording medium, and means for effecting relative movement at a constant speed between said recording medium and said recording-and-deriving means, the time spacing between sampling pulses being compressed in recording by physically disposing the sampling pulses on the recording medium in such manner that despite the constant speed of the recording medium, the pulses in the derived signal have a greater repetition rate than the pulses in the original sample.

15. A device for increasing playback speed relative to recording speed in signal-recording apparatus comprising, in combination: means for sampling the signal to be recorded, the number of sampling pulses being the quantity required to define said signal; and pulse recording-and-deriving means comprising a recording medium, means for recording the sample on said recording medium, said recording means including at least one recording element, means for deriving the recorded signal from said recording medium, and means for effecting cyclical relative movement at a constant speed between said recording medium and said recording-and-deriving means, each successive sampling pulse being recorded behind the preceding one in close physical proximity thereto after a time interval corresponding to the time required for at least one complete multiple of a cycle of relative movement plus the time equivalent fo the physical distance between each recorded pulse.

16. A device for increasing playback speed relative to recording speed in signal-recording apparatus comprising, in combination: means for sampling the signal to be recorded, the number of sampling pulses being the quantity required to define said signal; pulse recording-and-deriving means comprising a recording medium, means for recording the sample on said recording medium, said recording means including at least one recording element, means for deriving the recorded signal from said recording medium, and means for effecting cyclical relative movement at a constant speed between said recording medium and said recording-and-deriving means, each successive sampling pulse being recorded behind the preceding one in close physical proximity thereto after a time interval corresponding to the time required for at least one complete multiple of a cycle of relative movement plus the time equivalent of the physical distance between each recorded pulse; and timing means for synchronizing the operation of said sampling means and said pulse recording-and-deriving means.

17. A device for increasing playback speed relative to recording speed in signal-recording apparatus comprising, in combination: means for sampling the signal to be recorded, the number of sampling pulses being the quantity required to define said signal; and pulse recording-and-deriving means comprising a recording medium, means for recording the sample on said recording medium, said recording means including a plurality of recording elements, means for deriving the recorded signal from said recording medium, means for effecting cyclical relative movement at a constant speed between said recording medium and said recording-and-deriving means, each successive sampling pulse being recorded behind the preceding one in close physical proximity thereto after a time interval corresponding to the time required for at least one multiple of a cycle of relative movement divided by the number of recording elements plus the time equivalent of the physical distance between each recorded pulse.

18. A device for increasing playback speed relative to recording speed in signal-recording apparatus comprising, in combination: means for sampling the signal to be recorded, the number of sampling pulses being the quantity required to define said signal; pulse recording-and-deriving means comprising a recording medium, means for recording the sample on said recording medium, said recording means including a plurality of recording elements, means for deriving the recorded signal from said recording medium, means for effecting cyclical relative movement at a constant speed between said recording medium and said recording-and-deriving means, each successive sampling pulse being recorded behind the preceding one in close physical proximity thereto after a time interval corresponding to the time required for at least one multiple of a cycle of relative movement divided by the number of recording elements plus the time equivalent of the physical distance between each recorded pulse, and timing means for synchronizing the operation of said sampling means and said pulse recording-and-deriving means.

References Cited in the file of this patent

UNITED STATES PATENTS

| 2,476,445 | Lacy | July 19, 1949 |
| 2,566,189 | Gloess | Aug. 28, 1951 |
| 2,574,207 | Christian | Nov. 6, 1951 |
| 2,800,580 | Davies | July 23, 1957 |

OTHER REFERENCES

"The Cathode-Ray-Sound Spectroscope," article in Journal of the Acoustical Society of America, September 1947, pages 527–537.

"Gate Selects Pulses for Spectrum Analysis," article in Electronics, August 1956, pages 179–181.